(12) United States Patent
Casey et al.

(10) Patent No.: US 10,951,854 B2
(45) Date of Patent: Mar. 16, 2021

(54) SYSTEMS AND METHODS FOR LOCATION BASED IMAGE TELEGRAPHY

(71) Applicant: CenturyLink Intellectual Property LLC, Denver, CO (US)

(72) Inventors: Steven M. Casey, Littleton, CO (US); Bruce A. Phillips, Frederick, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 1283 days.

(21) Appl. No.: 13/855,502

(22) Filed: Apr. 2, 2013

(65) Prior Publication Data

US 2013/0286252 A1  Oct. 31, 2013

Related U.S. Application Data

(63) Continuation of application No. 10/681,530, filed on Oct. 8, 2003, now Pat. No. 8,665,325.

(51) Int. Cl.
| | | |
|---|---|---|
| *H04N 5/76* | (2006.01) | |
| *H04N 1/32* | (2006.01) | |
| *G01S 19/51* | (2010.01) | |
| *G01S 19/14* | (2010.01) | |

(52) U.S. Cl.
CPC ........... *H04N 5/76* (2013.01); *H04N 1/32101* (2013.01); *G01S 19/14* (2013.01); *G01S 19/51* (2013.01)

(58) Field of Classification Search
USPC .......................................................... 348/61
See application file for complete search history.

(56) References Cited

U.S. PATENT DOCUMENTS

| | | | |
|---|---|---|---|
| 5,151,608 A | | 9/1992 | Torii et al. |
| 5,373,344 A | | 12/1994 | Kakiuchi |
| 5,600,113 A | | 2/1997 | Ewers |
| 5,848,373 A | * | 12/1998 | DeLorme .............. G01C 21/20 340/990 |
| 5,875,561 A | | 3/1999 | Chen et al. |
| 5,913,078 A | * | 6/1999 | Kimura ................. G01S 19/235 396/310 |
| 5,991,040 A | | 11/1999 | Doemens et al. |
| 6,019,725 A | | 2/2000 | Vesely et al. |
| 6,023,241 A | * | 2/2000 | Clapper ................. G01S 19/14 342/357.32 |

(Continued)

OTHER PUBLICATIONS

U.S. Appl. No. 10/681,530; Issue Notification dated Feb. 12, 2014; 1 page.

(Continued)

*Primary Examiner* — Chikaodili E Anyikire
(74) *Attorney, Agent, or Firm* — Lumen Patent Firm

(57) ABSTRACT

Systems and methods for associating images with location and/or other information. In some cases, the systems include an image sensor, a location sensor, and a microprocessor. The microprocessor is communicably coupled to a computer readable medium that includes instructions executable by the microprocessor to: receive a location from the location sensor; receive an image from the image sensor; and associate the location with the image. Some of the methods provide for capturing an object image of an object using an image sensor; capturing a location of the image sensor; and associating the location with the object image. Other methods and systems are also disclosed.

17 Claims, 8 Drawing Sheets

(56) References Cited

U.S. PATENT DOCUMENTS

| | | |
|---|---|---|
| 6,083,353 A | 7/2000 | Alexander, Jr. |
| 6,141,881 A | 11/2000 | Ayres et al. |
| 6,175,381 B1 | 1/2001 | Oyaizu |
| 6,181,273 B1 | 1/2001 | Heide et al. |
| 6,222,583 B1 | 4/2001 | Matsumura et al. |
| 6,243,660 B1 | 6/2001 | Hsu et al. |
| 6,401,029 B1* | 6/2002 | Kubota ............ G01C 21/3611 701/408 |
| 6,401,037 B1 | 6/2002 | Muller et al. |
| 6,437,583 B1 | 8/2002 | Tartagni et al. |
| 6,492,652 B2 | 12/2002 | Muller |
| 6,526,351 B2 | 2/2003 | Whitham |
| 6,529,828 B1 | 3/2003 | Williams et al. |
| 6,535,243 B1 | 3/2003 | Tullis |
| 6,549,848 B1 | 4/2003 | Green et al. |
| 6,587,788 B1 | 7/2003 | Green |
| 6,636,256 B1 | 10/2003 | Passman et al. |
| 6,697,103 B1 | 2/2004 | Fernandez et al. |
| 6,900,762 B2 | 5/2005 | Andrews et al. |
| 7,145,597 B1 | 2/2006 | Kinjo |
| 7,119,831 B2 | 10/2006 | Ohto et al. |
| 7,146,192 B2 | 12/2006 | Cooper et al. |
| 8,665,325 B2 | 3/2014 | Casey et al. |
| 2002/0140745 A1* | 10/2002 | Ellenby ............... G01C 21/20 715/848 |
| 2003/0128137 A1 | 7/2003 | Hoetzel et al. |
| 2005/0078174 A1 | 4/2005 | Casey et al. |
| 2006/0182055 A1 | 8/2006 | Coffee et al. |
| 2010/0106801 A1* | 4/2010 | Bliss ............... G06F 17/3087 709/219 |
| 2013/0286252 A1* | 10/2013 | Casey ............... H04N 1/32101 348/231.99 |

OTHER PUBLICATIONS

U.S. Appl. No. 10/681,530; Advisory Action dated Feb. 26, 2008; 4 pages.
U.S. Appl. No. 10/681,530; Advisory Action dated Aug. 26, 2009; 4 pages.
U.S. Appl. No. 10/681,530; Final Rejection dated Jun. 18, 2009; 17 pages.
U.S. Appl. No. 10/681,530; Final Rejection dated Jul. 22, 2010; 17 pages.
U.S. Appl. No. 10/681,530; Final Rejection dated Sep. 25, 2007; 12 pages.
U.S. Appl. No. 101681,530; Non-Final Rejection dated Jan. 3, 2012; 16 pages.
U.S. Appl. No. 10/681,530; Non-Final Rejection dated Jan. 6, 2010; 15 pages.
U.S. Appl. No. 10/681,530; Non-Final Rejection dated Dec. 12, 2008; 15 pages.
U.S. Appl. No. 10/681,530; Non-Final Rejection dated Apr. 5, 2007; 14 pages.
U.S. Appl. No. 10/681,530; Non-Final Rejection dated Jul. 3, 2012; 12 pages.
U.S. Appl. No. 10/681,530; Notice of Allowance dated Jan. 3, 2013; 14 pages.
U.S. Appl. No. 10/681,530; Pre-Appeal Decision dated Oct. 2, 2008; 2 pages.

* cited by examiner

SYSTEMS AND METHODS FOR LOCATION BASED IMAGE TELEGRAPHY

CROSS REFERENCE TO RELATED APPLICATION

This application is a continuation of U.S. patent application Ser. No. 10/681,530, filed Oct. 8, 2003 by Steven M. Casey et al. and entitled, "Systems and Methods for Location Based Image Telegraphy,", which is hereby incorporated by reference in its entirety.

BACKGROUND OF THE INVENTION

The present invention is related to systems and methods for image capture, and in particular to systems and methods for associating information with a captured image.

In a typical image capture scenario, a user snaps a photograph with a conventional camera and some time later deposits the exposed film with a processor. The developed photographs are returned, and the user is then tasked with writing either on the photographs or on a separate paper to identify the location and/or subject matter of the photograph. The advent of digital photography changed this scenario slightly by eliminating the need to use a processor for developing film.

In many cases the location and/or the subject matter of the photographs is forgotten before the user has a chance to see the image and record information about the image. Further, in the case of digital photography, the images can possibly be transmitted where they are immediately viewed and nearly immediately discarded. Thus, it can be the case that an important image is never fully considered because the recipient does not fully understand what they are viewing.

Hence, there exists a need in the art to address the aforementioned limitations, as well as other limitations.

BRIEF SUMMARY OF THE INVENTION

The present invention is related to systems and methods for image capture, and in particular to systems and methods for associating information with a captured image.

In some embodiments of the present invention, an image is captured along with various location information. This location information can include a location of the imaging device, the direction that the imaging device is pointed, one or more distances from the imaging device to respective objects in the captured image, and/or locations of respective objects within the captured image. This location information can then be appended to a digital image file. In this way, a file including the captured image also includes relevant information about the image.

Other more detailed information can also be stored in relation to the image. In some cases, the imaging device can access a query database and obtain information about an object within a given image. In some cases, this query database is included in the imaging device, while in other cases, the query database is external to the imaging device and can be accessed via, for example, a communication network. Thus, for example, such a device could be used for a self guided walking tour where the user points the imaging device at an object, and additional information about the object is provided to the user via the imaging device. In some cases, the additional information includes historical information, rate information, access information, driving directions, walking directions, parking directions, and/or the like. In some cases, the image is not captured, but rather the imaging device is merely used to image the object and to obtain and display additional information about the object.

In some cases, the image, location information, and/or additional information are displayed to a user via a display integrated with the imaging device. In some cases, the information can be superimposed over the image of the object, while in other cases the information can be displayed on a split screen with the image of the object. In some cases, this information can be continuously updated as the imaging device is directed at different objects.

Some embodiments of the present invention include systems for providing location information in relation to an imaging device. Theses systems include a location sensor, an image sensor, and a microprocessor. The microprocessor is communicably coupled to the location sensor, the image sensor, and a computer readable medium. The computer readable medium includes instructions executable by the microprocessor to: receive a location from the location sensor; receive an image from the image sensor; and associate the location with the image.

In particular cases, the location captured by the location sensor is a location of the image sensor. In such cases, the systems can further include a distance sensor and a direction sensor. The computer readable medium also includes instructions executable by the microprocessor to: receive a distance from the distance sensor; receive a direction from the direction sensor; and calculate the location of an object in the image. This calculation is based at least in part on the location of the image sensor, the direction, and the distance from the image sensor.

In particular cases, the system further includes a transmitter and a receiver. A request for additional information about an object in the image can be transmitted across a communication network to a query database, and in response to the request additional information about the object can be returned to the system. As one example, the object in the image can be a landmark, and the information returned from the query database can include, but is not limited to, historic information, access rates, access information, driving directions, parking information, walking directions, and/or a map with the location of the object pointed out. As a more specific example, the object can be a restaurant, and the information about the object includes a menu for the restaurant. As another specific example, the object can be a hotel, and the information about the object includes rates for the hotel and/or availability information about the hotel.

In some cases, the systems include a display that is operable to display the image, the descriptive or additional information about the object in the image, the location of the image sensor, the direction of the image sensor, the distance from the image sensor to the object in the image, and/or the location of the object in the image. In some cases, the system is further capable of accessing a map that includes a route from the location of the image sensor to the location of the object. Such a map can be provided on the display. This map can be a street map, a topological map, a combination thereof, and/or the like.

In some cases, the systems include a video imaging device. In such devices, the location and/or descriptive information can be progressively updated and associated with successive frames of the image captured by the image sensor. Similarly, even where the image sensor is primarily used to capture still images, the display can be progressively updated with location and/or descriptive information as the system is progressively pointed at different objects.

Other embodiments of the present invention provide methods for obtaining location information in relation to an object image. These methods include capturing an object image of an object using an image sensor, and capturing a location of the image sensor. This location and image information is then associated. In some cases, the methods further include capturing a direction of the image sensor and a distance from the image sensor to the object. Based at least in part on the direction and distance information, the location of the object in the image is calculated.

In some cases, the methods further include requesting information about the object in the image, and receiving the requested information. This information can then be provided on a display. This display can include the information superimposed over the image, or provide the information and the image on different displays and/or different portions of the display. In various cases, the methods also include storing the image of the object in association with the information about the object.

Yet other embodiments of the present invention include a handheld camera with a location sensor, an image sensor, and a controller. The controller is operable to associate a location from the location sensor with an image from the image sensor. In some cases, the handheld camera includes a display, and the controller is operable to update the display to include the image from the sensor and the location from the location sensor.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for image capture, and in particular to systems and methods for associating information with a captured image.

In some embodiments of the present invention, an image is captured along with various location information. This location information can include a location of the imaging device, the direction that the imaging device is pointed, one or more distances from the imaging device to respective objects in the captured image, and/or locations of respective objects within the captured image. This location information can then be appended to a digital image file. In this way, a file including the captured image also includes relevant information about the image.

Figure 1:
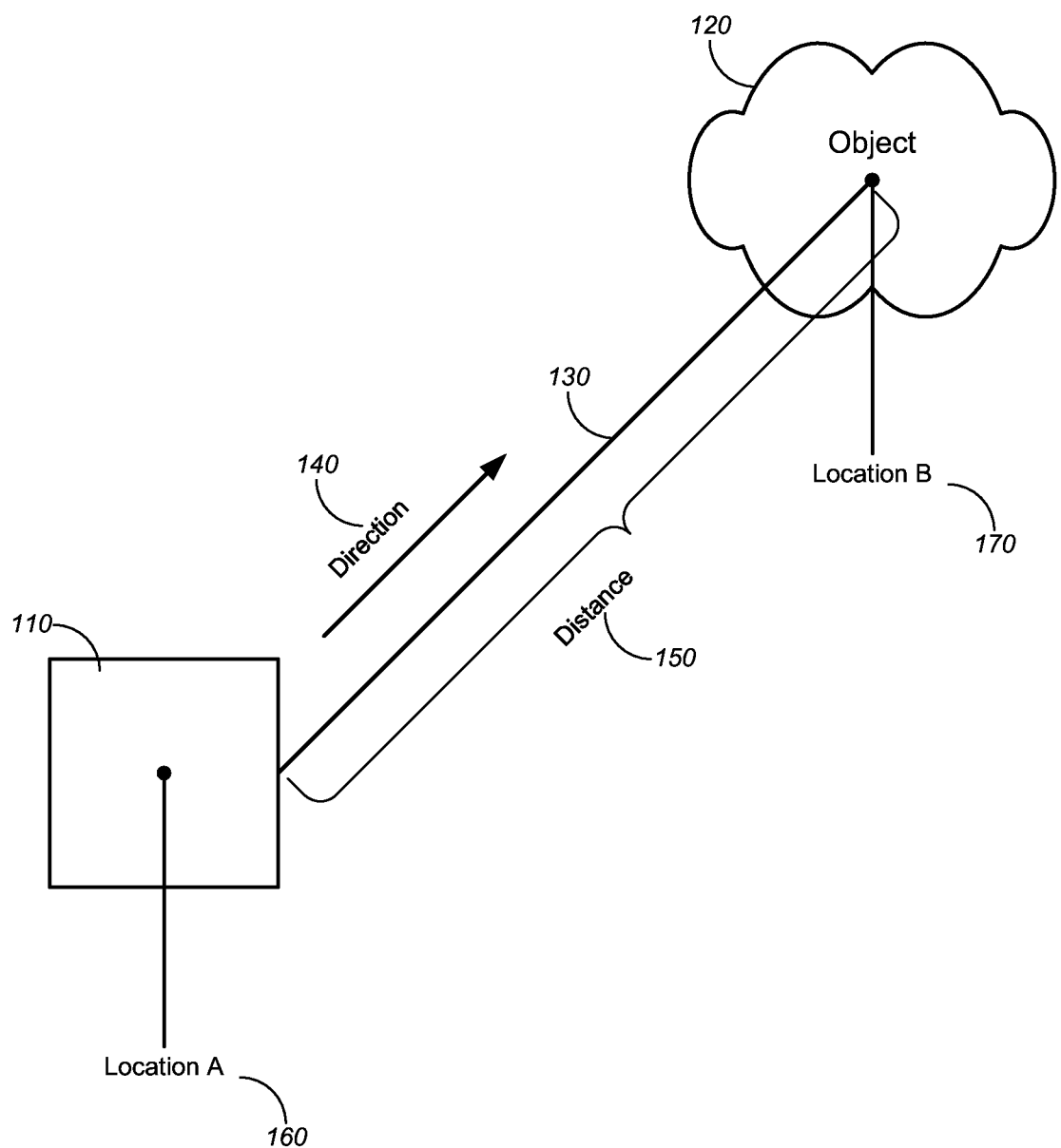
FIG. 1 illustrates an embodiment of an imaging device in relation to an imaged object in accordance with some embodiments of the present invention.

Turning to FIG. 1, one embodiment of an imaging device 110 in relation to an imaged object 120 is illustrated. Imaging device 110 obtains an image of an object 120 visible along a line of sight 130. Further, imaging device 110 includes capability to determine a distance 150 from imaging device 110 to object 120, a direction 140 from imaging device 110 to object 120, and a location 160 of imaging device 110. Direction 140, distance 150, and location 160 can be used to calculate a location 170 of object 120. It should be recognized that other embodiments of imaging device 110 do not include a distance sensor and/or a direction sensor. In such cases, imaging device 110 may only provide the ability to determine location 160 of imaging device 110, location 160 of imaging device 110 and distance 150, or location 160 of imaging device 110 and direction 140.

The imaging device can be any device capable of imaging an object. Thus, as just some examples, the imaging device can be a digital camera, a video camera, a cell phone with integrated imaging capability, a personal digital assistant (PDA) with imaging capability, and/or the like. The location sensor can be any device or system capable of determining the location of the imaging device. Thus, as just one example, the location sensor can be a semiconductor device capable of receiving and analyzing location information from the Global Positioning System (GPS).

The location of objects within an image can be determined based upon one or more sensors. For example, in one case, a direction sensor and a distance sensor are used to determine the location of an object in the image. This can include determining a distance of the object from the image sensor. To do this, an optical, sound, or radar distance sensor as are known in the art can be employed. Further, to determine direction, a digital compass or some other direction sensor can be employed. A direction relative to the imaging device is provided by the direction sensor, and a distance relative to the imaging device is provided from the distance sensor. The location of the imaging device is known from the location sensor, and the distance and direction information is used as an offset from the known location of the imaging device. By adding this offset, a location of the object in the image can be calculated.

Other more detailed information can also be stored in relation to an image. In some cases, the imaging device can access a query database and obtain information about an object within a given image. In some cases, this query database is included in the imaging device, while in other cases, the query database is external to the imaging device and can be accessed via, for example, a communication network. Thus, for example, such a device could be used for a self guided walking tour where the user points the imaging device at an object, and additional information about the object is provided to the user via the imaging device. In some cases, the additional information includes historical information, rate information, access information, driving directions, walking directions, parking directions, and/or the like. In some cases, the image is not captured, but rather the imaging device is merely used to image the object and to obtain and display additional information about the object.

In some cases, the image, location information, and/or additional information are displayed to a user via a display integrated with the imaging device. In some cases, the information can be superimposed over the image of the object, while in other cases the information can be displayed on a split screen with the image of the object. In some cases, this information can be continuously updated in real time as the imaging device is directed at different objects.

Figure 2:
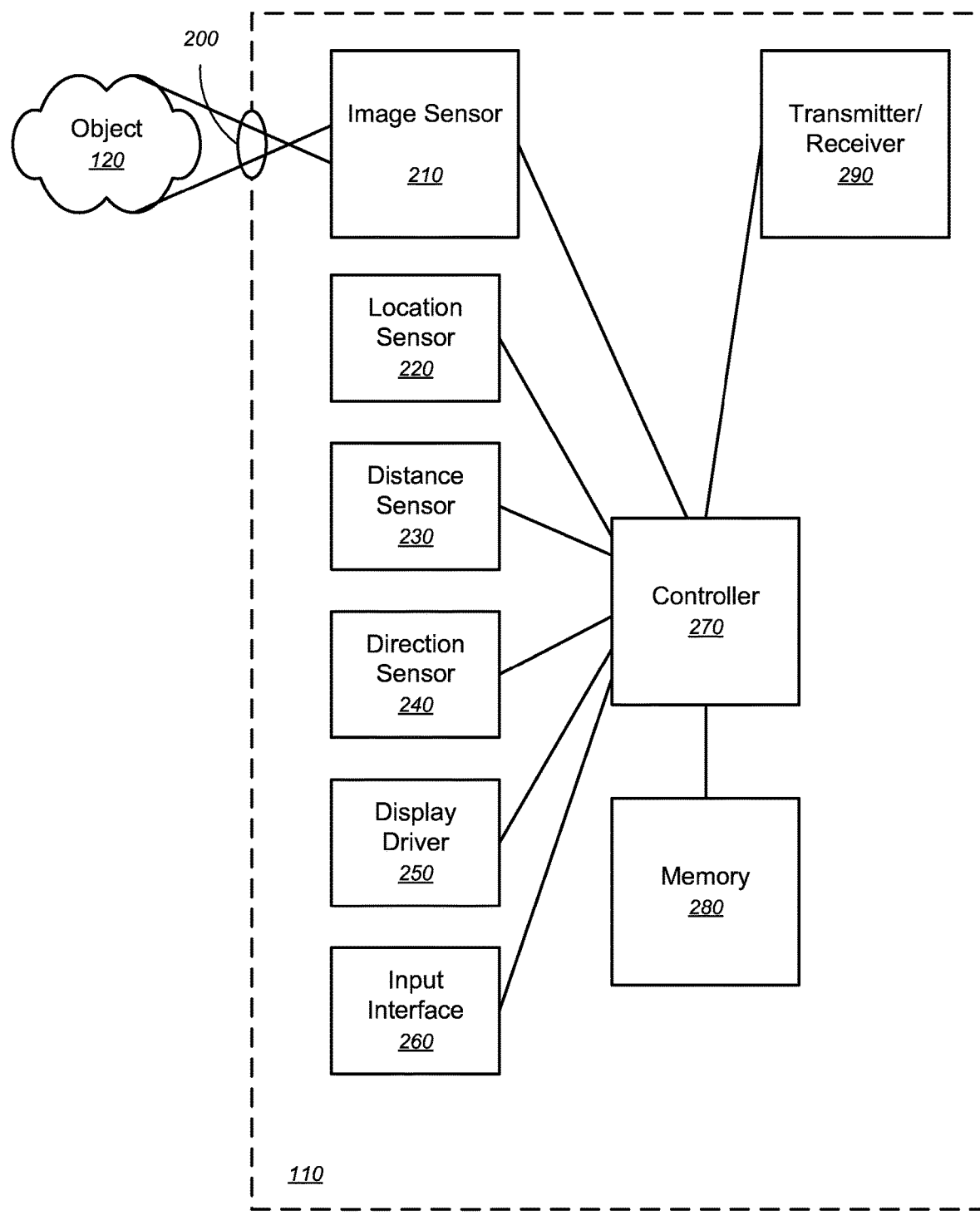
FIG. 2 is a block diagram of imaging device in accordance with various embodiments of the present invention.

Turning to FIG. 2, a block diagram of imaging device 110 in accordance with various embodiments of the present invention is provided. As illustrated, imaging device 110 includes a lens 200. This lens can include autofocus capability, or in some cases can be a very simple transparent element allowing light to impinge on an image sensor 210. Image sensor 210 can be any type of image sensor known in the art. As just some examples, image sensor 210 can be a Charge Coupled Device (CCD) arranged as a rectangular array. Alternatively, image sensor 210 can be a Complimentary Metal Oxide Semiconductor (CMOS) image array comprised of a number of CMOS pixels arranged in a rectangular pixel array as are known in the art. Based on this disclosure, one of ordinary skill in the art will appreciate a variety of image sensor types and/or implementations that can be used in accordance with embodiments of the present invention. Image sensor 210 can further include various image processing features as are known in the art. Such processing features can, for example, provide the detected image in a prescribed format with desired brightness, contrast, sharpness, and/or bandwidth attributes. In some cases, one or more of the processing features is implemented as part of a controller 270.

In some cases, the various blocks (200-290) illustrated in imaging device 110 of FIG. 2 can be implemented on a single semiconductor chip. In other cases, the various blocks can be implemented on different semiconductor chips, or a combination of blocks can be implemented on one semiconductor chip, and a combination of other blocks can be implemented on another semiconductor chip. In such cases, the different semiconductor chips can be packaged separately, or combined in a multi-chip package. Based on this disclosure, one of ordinary skill in the art will appreciate a number of implementation and/or packaging options that can be used in accordance with embodiments of the present invention.

Imaging device 110 further includes a location sensor 220. Location sensor 220 can be, but is not limited to, a GPS sensor capable of fixing the location of imaging device 110 as a set of absolute coordinates. Using the GPS location sensor as an example, location sensor 220 determines the location of imaging device 110 by analysis of satellite position determining signals as is known in the art. In some cases, this location information is limited to map, or two dimensional location. This two dimensional location can be expressed as longitude and latitude. In other cases, the location information also includes altitude information.

Imaging device 110 can include a distance sensor 230. In some embodiments, distance sensor 230 is integrated with an autofocus used to adjust lens 200 in relation to image sensor 210. When an object in the image is brought into focus, the distance from lens 200 to image sensor 210 will be a certain length. This length along with attributes of lens 200 can be used to determine the distance to the object within a certain error range. Alternatively, a radar, optical, or sound based distance sensor can be used as are known in the art. As yet other alternatives, distance sensor 230 may include an input where an estimated distance can be input by a user.

Imaging device 110 also includes a direction sensor 240. Direction sensor 240 can be, but is not limited to, a digital compass as known in the art. This digital compass is operable to determine direction, or orientation of imaging device 110.

Controller 270 is included to control the operation of imaging device 110. This control can include associating location information with a detected image, formatting the image, preparing the image and/or location information for transmission, receiving information in relation to the image, controlling the display of the image and/or associated information local to imaging device 110 (this can be done in relation to a display driver 250 that can be implemented as part of controller 270), and/or accepting commands received via a transmitter/receiver 290 and/or via a user input interface 260. In one embodiment, controller 270 is a general-purpose computer. One example of such a general purpose computer is an Intel™ Pentium™ Processor or one of various Reduced Instruction Set Computers (RISC) offered by Motorola™. One of ordinary skill in the art will recognize a number of general purpose computers that can be used in accordance with the present invention. Alternatively, controller 270 is implemented using a microcontroller, an Application Specific Integrated Circuit (ASIC) device, or a Field Programmable Gate Array (FPGA) device. In some cases, the general purpose computer, microcontroller, ASIC, and/or FPGA are designed to execute instructions provided via one or more software programs. Further, as used herein, the terms "microprocessor" and "controller" are used in their broadest sense, and can refer to any of a general purpose computer, microcontroller, ASIC, FPGA, and/or combination thereof.

Controller 270 is communicably coupled to a memory 280. Memory 280 can be any computer readable medium including, but not limited to, a Random Access Memory (RAM), a Read Only Memory (ROM), a hard disk drive, an insertable RAM included on a PCMCIA card, and/or any combination thereof. In some cases, memory 280 is virtually extendable by transmitting and/or accessing portions of the memory to external memory elements using transmitter/receiver 290. Thus, memory 280 can further include network database servers, tape drives, and/or a variety of other computer readable media. Memory 280 can include instructions executable by controller 270 to operate imaging device 110. Further, memory 280 can be used to hold images and associated information. Yet further, memory 280 can include information about the various detected images. Thus, where imaging device 110 is used for example in relation to a walking tour, information about the various sites seen on the walking tour can be included in memory 280. This additional information can be uploaded to memory 280 from a central location.

Transmitter/receiver 290 can be any device capable of communicating across a communication network. Thus, for example, transmitter/receiver 290 can be a wireless transmitter/receiver as are commonly found on cellular telephones. In other cases, transmitter/receiver 290 can be implemented as a two-way radio interface. Based on the disclosure provided herein, one of ordinary skill in the art will appreciate a number of implementations of transmitter/receiver 290. Further display driver 250 can be any driver capable of operating a particular display. Thus, for example, where imaging device 110 includes a 4×5 liquid crystal display, display driver 250 can be selected to drive such a display. Based on the disclosure provided herein, one of ordinary skill in the art will appreciate a number of displays and/or display drivers that can be used in relation to the present invention. Input interface 260 can be any device or system capable of receiving information from a user interface. In one particular example, input interface 260 is capable of accepting input from a keyboard of a cellular telephone and/or various buttons on a camera. Based on the disclosure provided herein, one of ordinary skill in the art will appreciate a number of input devices and/or input interfaces that can be used in relation to embodiments of the present invention.

It should be recognized that all of the elements illustrated in FIG. 2 can be included with imaging device 110, or that only a subset of the elements may be included. Thus, as one example, transmitter/receiver 290 may not be included in all embodiments. Alternatively, direction sensor 240 may not be included. Based on this disclosure, one of ordinary skill in the art will appreciate a number of combinations that can be combined to create different embodiments of an imaging device in accordance with embodiments of the present invention.

Figure 3:
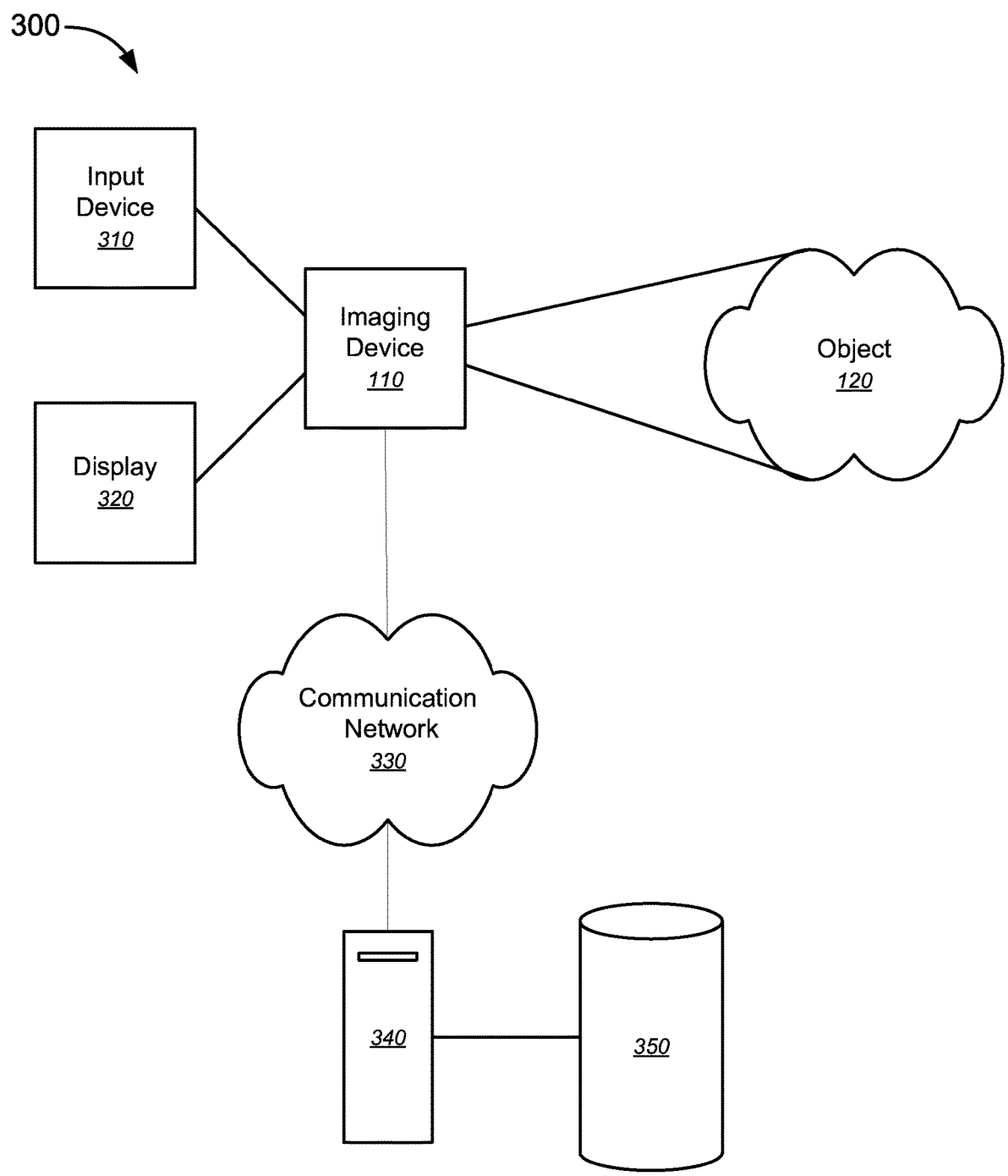
FIG. 3 depicts a system including an imaging device with an integrated display and input device in accordance with various embodiments of the present invention.

Turning to FIG. 3, a system 300 including an imaging device 110 with an integrated display 320 and input device 310 in accordance with some embodiments of the present invention is depicted. System 300 includes a communication network 330 that communicably couples imaging device 110 with a network server 340. Communication network 330 can be any communication network. As just one example, communication network 330 can be a cellular telephone network. Network server 340 is further communicably coupled to a database 350. Database 350 can include information about various sites that can be imaged. Such information can include historical information, access information, parking information, route information, map information, and/or the like.

Other embodiments of the present invention provide methods for obtaining location information in relation to an object image. These methods include capturing an object image of an object using an image sensor, and capturing a location of the image sensor. This location and image information is then associated. In some cases, the methods further include capturing a direction of the image sensor and a distance from the image sensor to the object. Based at least in part on the direction and distance information, the location of the object in the image is calculated.

In some cases, the methods further include requesting information about the object in the image, and receiving the requested information. This information can then be provided on a display. This display can include the information superimposed over the image, or provide the information and the image on different displays and/or different portions of the display. In various cases, the methods also include storing the image of the object in association with the information about the object.

Figure 4:
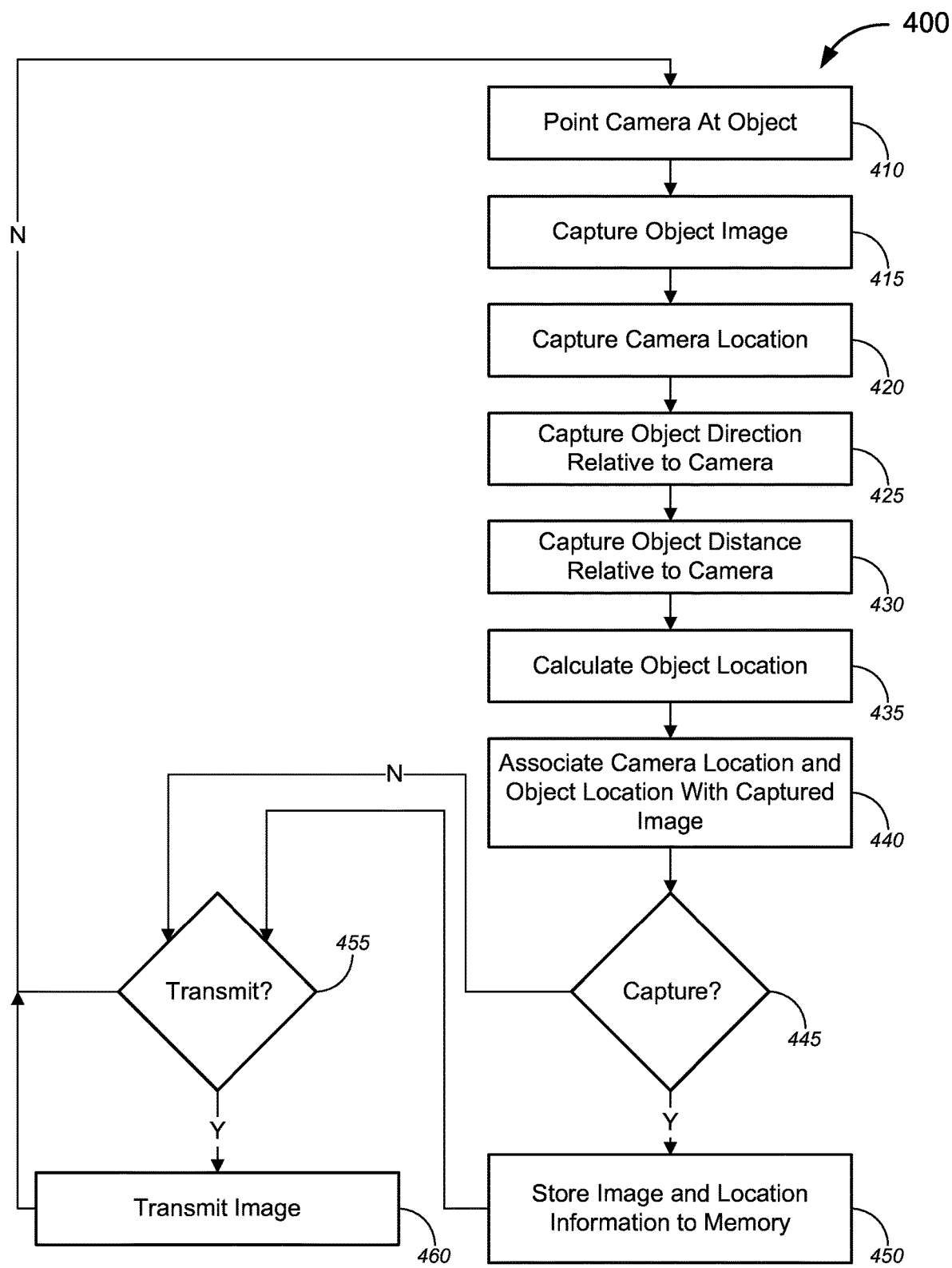
FIG. 4 is a flow diagram illustrating one method in accordance with some embodiments of the present invention.

Turing to FIG. 4, a flow diagram illustrates one method in accordance with some embodiments of the present invention. Following flow diagram 400, a camera is pointed at an object such that an image of the object is found in the viewfinder of the camera (block 410). An image of the object is captured (block 415) along with a location of the camera (block 420). Further, in embodiments where the camera includes direction and distance sensors, the orientation of the camera is captured (block 425) along with the distance from the camera to the object (block 430). Using this information, the location of the object is calculated (block 435). In particular, this calculation includes adding the captured distance to the captured location of the camera at a direction captured by the direction sensor.

The camera location and object location are associated with the detected object image (block 440). This can be done by superimposing the information on top of the image and within the viewfinder of the camera. Alternatively, the information and the image can be presented on a split screen. In some cases, this information can be continually updated as the camera is pointed at different objects. Alternatively, this information may only be updated when an image capture occurs.

It is next determined if the image is to be captured (block 445). Where the image is to be captured (block 445), the image and the associated location information is stored to memory (block 450). Alternatively, where the image is not to be captured (block 445) or where the image capture is complete (block 450), it is determined if the image is to be transmitted (block 455). Where the image is to be transmitted (block 455), the image is transmitted via a communication network.

Figure 5:
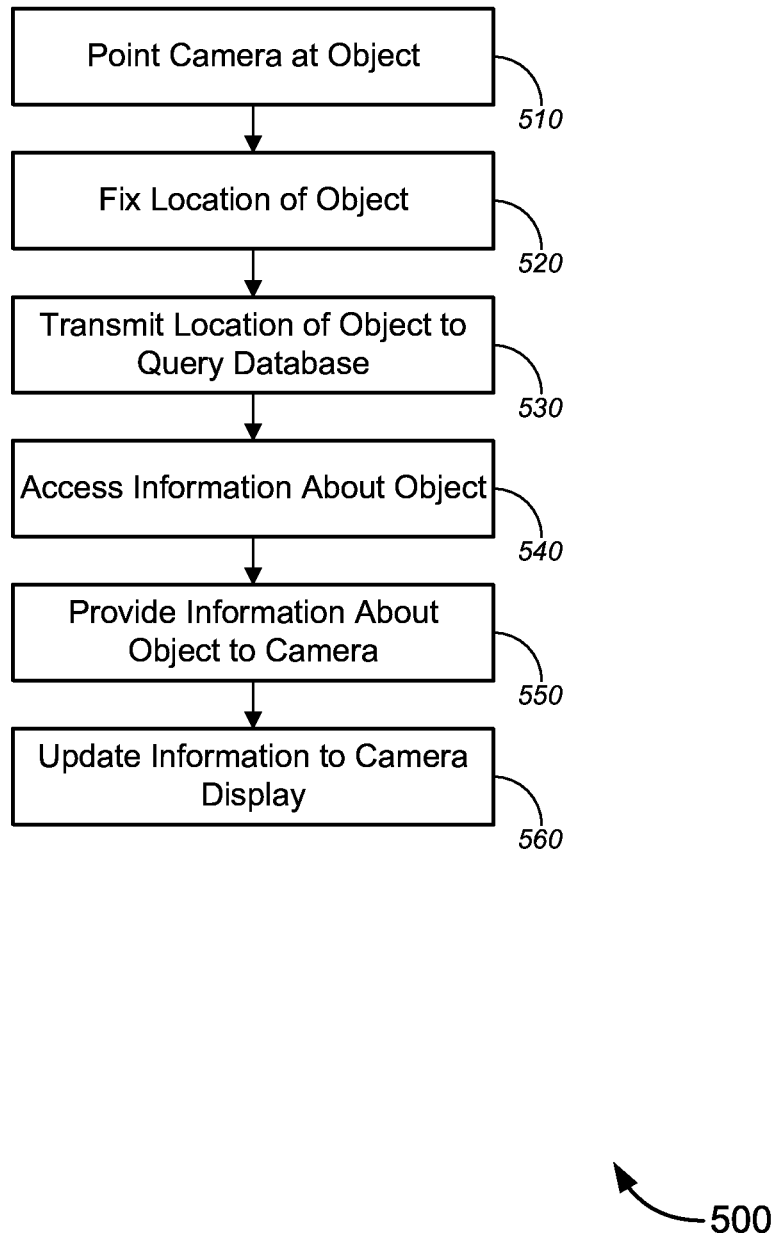
FIG. 5 is another flow diagram depicting another method in accordance with various embodiments of the present invention.

Turning to FIG. 5, another flow diagram 500 illustrates another method in accordance with various embodiments of the present invention. Following flow diagram 500, a camera is pointed at an object such that the object appears in the viewfinder of the camera (block 510). The location of the object is fixed using a method such as that described in relation to flow diagram 400 (block 520). The fixed location is transmitted to a query database (block 530). This can include providing the location to a database maintained local to the camera, or across a communication network to a database maintained remote from the camera. The location information is used to access information about the object at that location (block 540). This information is provided to the camera (block 550) where it is updated to the display associated with the camera (block 560).

Figure 6:
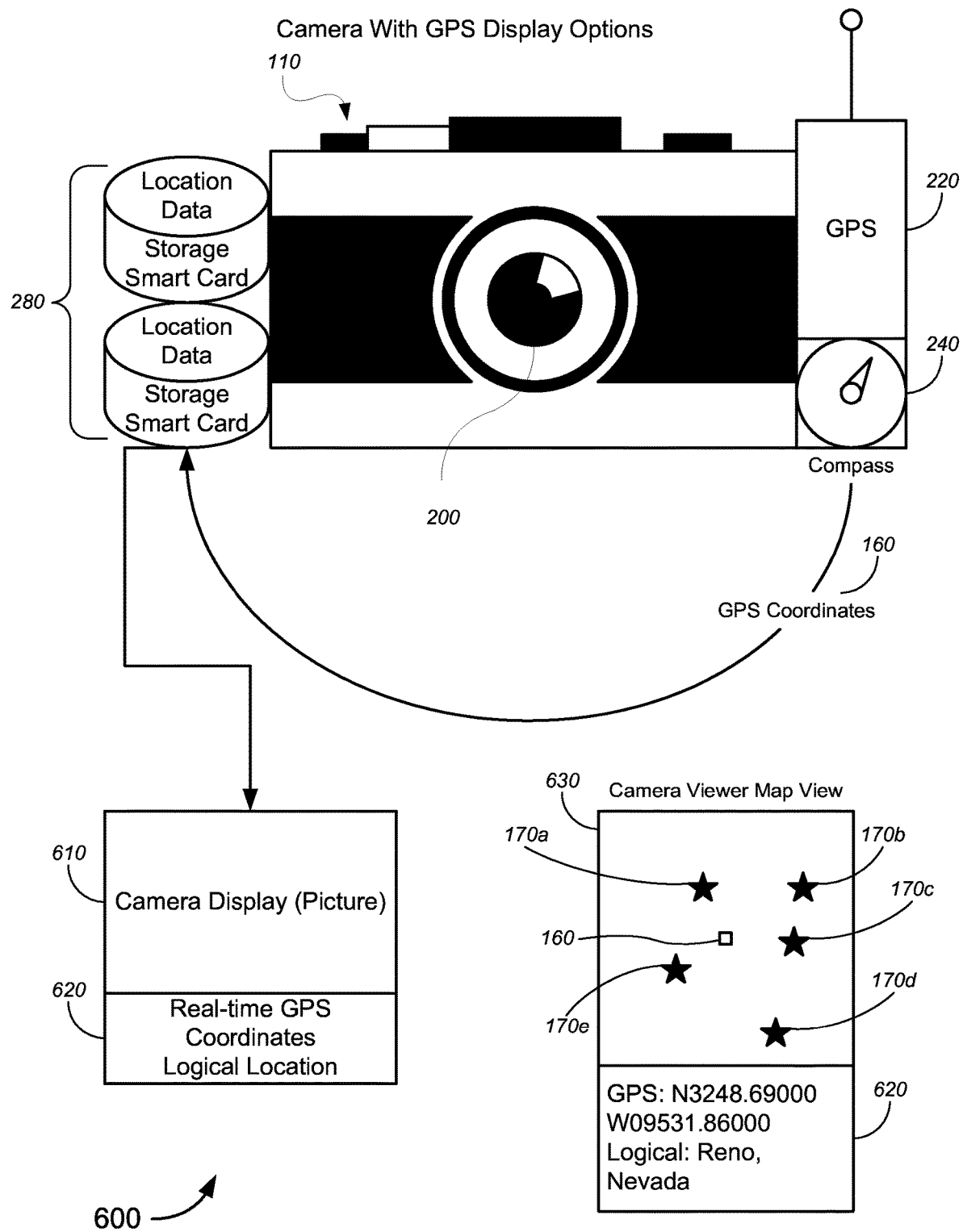
FIG. 6 is a diagram illustrating various display options available in accordance with embodiments of the present invention.

Turning to FIG. 6, a diagram 600 illustrates a camera 110 with various display options in accordance with some embodiments of the present invention is illustrated. As illustrated, imaging device 110 captures an image 610 of an object and associates a location 620 of the imaging device on a split screen display. Further, imaging device 110 includes capability to display a map view 630 along with the location information 620 on a split screen. Map view 630 can include a number of locations 170, as well as an indication of location 160 of the imaging device. Locations 170 can be waypoints or locations of other images that are stored in the memory of imaging device 110. Waypoints can be useful where imaging device 110 attends a user on a tour or some other multi-destination journey.

Alternatively, locations 170 of previously captured object images can be useful to document a number of images that have been captured. In such a system, the GPS coordinates and logical locations can be stored in or attached to the image files as the image files are captured. This location information can be processed for placement on the map. In some cases, this information can be placed on the map in addition to waypoint information. By performing this operation, the image will have all the detail for relocating the site where the image was originally captured. In addition, this data can be stored on the computer to be later uploaded to the camera as a location device to return to the image capture site. For static images the details will be mapped on a point-by-point basis. For active, or video images, waypoints or path that was taken to capture the image will be stored with the picture. By doing this the user can return to the exact location following the same path.

In some cases, the imaging device provides a simple method for using the imaging device for mapping Inside or Outside Plant Equipment. This information can then be sent back to a Network Engineering Center (NEC) or stored locally to be uploaded at the NEC at a later point. The camera can include storage for logical data locations, GPS coordinates, and waypoints along the path. As previously discussed, the imaging device shows GPS coordinates along with an object image. In some cases, the user has an option to add additional information relative to the image in another associated file. This additional information is stored to the memory of the imaging device.

In yet other embodiments, the imaging device supports an ability to point the camera at a location in the viewfinder, and the camera will take the GPS data and display any logical information about the object(s) that is/are displayed in the viewfinder with real-time mapping support. This data can be pulled from the storage in the imaging device's memory and mapped to the GPS coordinates. This data could include: building names, facilities names, outside plant equipment names, sites, and/or the like. This data can, for example, be loaded from a computer and stored dynamically in the memory of the imaging device. This is accomplished by mapping the GPS coordinates to the logical locations database. In addition, the logical locations database will have a link to another database that includes detailed information about this logical location or GPS coordinates. Where it is a computer network that is to be investigated using the imaging device, this data can include: detailed building information, detailed cabinet configurations, customer data, number of configured cards, site of interest, etc. This data will also be user definable and only limited to the storage available on the imaging device.

Following the example of investigating a computer network and/or other plant equipment, the following information can be gathered via imaging device 110: GPS Coordinates, logical location, cabinet description, cabinet type, path to cabinet, mapped locations, and/or the like. A process for mapping Inside and Outside Plant Equipment is as follows: (1) as the technician is leaving the central garage, they can turn on the mapping function of the camera. They will press the map location button to start the logging process. This process will store GPS waypoints in a table from the central garage location to the remote cabinet; (2) while the technician is driving to the remote cabinet location the path will be recorded in the camera storage; (3) when the technician arrives at the Outside Plant Equipment (OSP), they will turn off the mapping function, then they will take a picture of the cabinet and store the logical location data, GPS Coordinates, and other details about the facilities in the still image; (4) the technician will take a Global Positioning System Location System (GPSLS) to the OSP cabinet for installation, and at this point, they will check the display for the signal strength of the GPS satellites that the GPSLS can reach; (5) the installer will locate where in the cabinet the GPSLS can receive the strongest signal and install the GPSLS here; (6) the GPSLS will have additional configurations that can be input about the cabinet, such as, descriptive location, cabinet type, cabinet maker, etc the installer will input this data in the unit; (7) the GPSLS will be attached to the Service Provider via a network interface; (8) once the unit is programmed, it will transmit its data to the Network Engineering Center (NEC) via SNMP; (9) the NEC will gather the cabinet data and record its data in the backend data base system; and (10) the next time a trouble is called in for that cabinet, the mapping data will be copied to the technician's GPS receiver and they will follow the map to the cabinet.

By having this data about the cabinet and linking it to the GPS system, the tech can know if they are off coarse or have taken a wrong turn. In addition, new techs will be able to locate cabinets with ease. This can reduce the amount of time it takes to locate cabinets in remote rural locations.

A margin will be applied to the GPS coordinates to determine the logical location define in that area. This margin can be 1 foot to 25 feet (or more) within the area of the GPS coordinates. The margin will be defined by the user to fit the appropriate situation. For example, for OSP equipment the margin will be greater that for indoor equipment in the rack.

Figure 7:
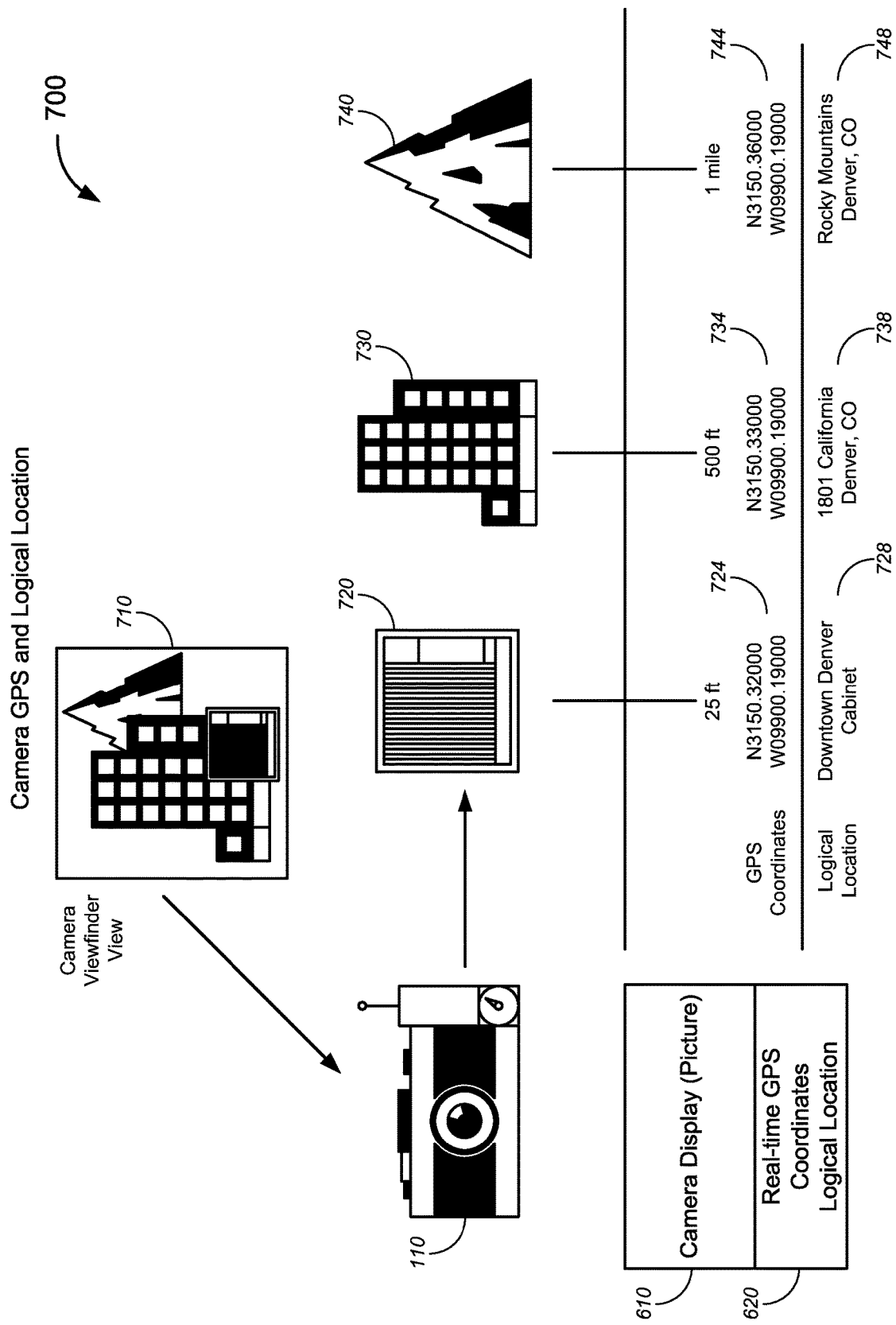
FIG. 7 depicts an example of locating multiple included within a common image in accordance with various embodiments of the present invention.

Turning to FIG. 7, an example 700 is illustrated where multiple objects 720, 730, 740 are included in a viewfinder 710 of imaging device 110. In such a case, imaging device 110 can include a button that can be pressed when each of the objects in viewfinder 710 is centered within viewfinder 710. Thus, the coordinates 724, 734, 744 and logical locations 728, 738, 748 can be respectively associated with the image based on the user's selection.

In some cases, the imaging device includes the ability to upload maps to the memory. By doing this the user is given the option of turning on the camera and see the path they need to take. This will be accomplished by using GPS waypoints to store a path. The camera can track the stored path against the actual path the user is taking. The display can list if the user is "on path," "off path," and direction to correct the path. As well, the camera can also be turned on to track the path and store this to the memory for uploading to the computer for mapping as well. By doing this the data can be shared on the Internet with multiple users so they can follow the same path and see the same locations. The camera can also have the option of storing maps. In this way the viewfinder can display the stored map and the current location via GPS in the camera viewfinder. The user is given the ability to track their location as well as see where images were captured. Each image captured can store a GPS waypoint on the cameras display via the map. The user can then track where they have captured images. The waypoint can be put together to create an image route.

Figure 8:
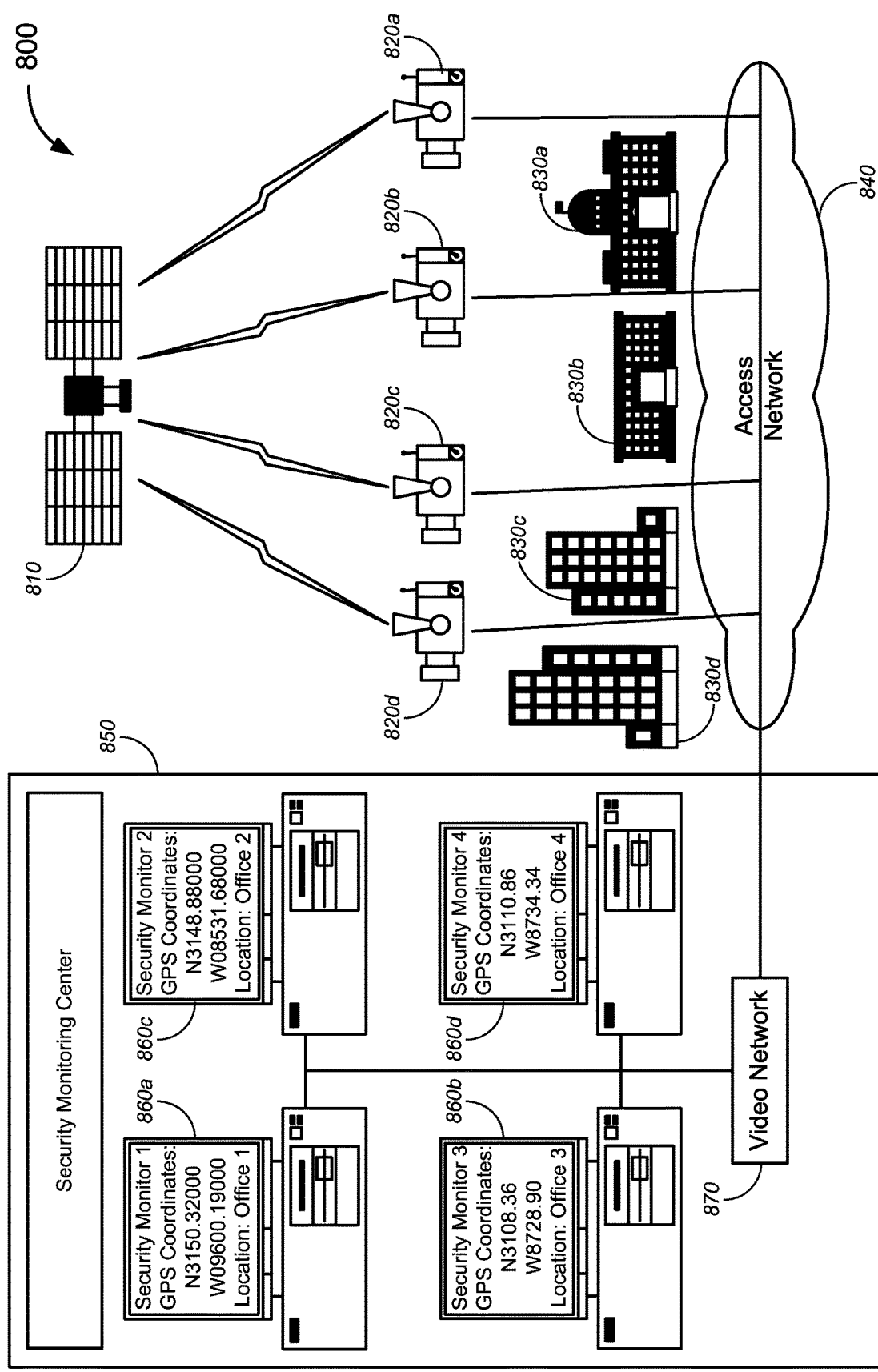
FIG. 8 illustrates a security monitoring system in accordance with some embodiments of the present invention.

Turning to FIG. 8, a security monitoring system 800 is illustrated in accordance with some embodiments of the present invention. Security monitoring system 800 includes one or more satellites 810 providing location information to a number of security cameras 820 that monitor respective buildings 830 that are remote from a security monitoring center 850. Each of the security cameras 820 are communicably coupled to security monitoring center 850 via an access or communication network 840 and a video network controller 870. The output from each of the respective security monitoring cameras 820 is displayed on respective displays 860 located at security monitoring center 850.

Each security camera 820 can include a location sensor as previously described in relation to imaging device 110. When the video image is sent from a respective security camera 820 to security monitoring facility 850, the GPS coordinates will be included with the image. This data can be placed on a map to show the exact location of the camera as well as the direction the camera is pointing. If there is a problem at one of buildings 830, the GPS data and the image information can be dispatched to a local security officer, police, or emergency personnel. Where one or more of security cameras 820 is/are moved or connected to another location it can automatically be added to the security map once it starts broadcasting. In addition, the video camera's tracking function (waypoint logging via GPS) can be activated to map from security monitoring center 850 to the remote monitoring location. In this way, the path to the camera can be stored.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for providing descriptive information about an object, the system comprising: a location sensor; a direction sensor; an image sensor; a display device; a microprocessor; and a computer readable medium, wherein the computer readable medium includes instructions executable by the microprocessor to: receive a first location from the location sensor, the first location being a location of the location sensor; receive video from the image sensor, the video comprising a plurality of images; receive a direction from the direction sensor; calculate a second location based at least in part on the first location and the direction, the second location being a location of an object in the captured images; provide the location of the object to a query database; receive, from the query database, descriptive information about the object; and cause the display device to display at least some of the descriptive information along with a live display of the video received from the image sensor as the plurality of images are being captured, wherein the descriptive information comprises at least one of historic information, access rates, driving directions, parking information, walking directions, and menus; and wherein the instructions are further executable by the microprocessor to associate the location from the location sensor with successive frames of the image from the image sensor.

2. The system of claim 1, wherein the instructions are further executable by the processor to store one of the captured images along with the descriptive information about the object.

3. The system of claim 1, further comprising a distance sensor, and wherein calculating a second location comprises calculating a second location based at least in part on the first location, the direction, and a distance received from the distance sensor.

4. The system of claim 1, wherein the system is incorporated within a wireless phone.

5. The system of claim 1, wherein the object is a landmark.

6. The system of claim 1, wherein the object is a restaurant.

7. The system of claim 1, wherein the display is operable to display further information selected from the following: the location of the image sensor, the direction of the image sensor, the distance, and the location of the object.

8. The system of claim 1, wherein the instructions are further executable by the microprocessor to update the descriptive information in real time when the image sensor captures images of different objects.

9. A method for obtaining location information in relation to an object, the method comprising: capturing video with an imaging device, the imaging device comprising an image sensor, a direction sensor, a location sensor, a display device, and a microprocessor; detecting, with the location sensor, a first location, the first location being a location of the location sensor; capturing video with the image sensor, the video comprising a plurality of images; determining, with the direction sensor, a direction of the image sensor; calculating, with the microprocessor, a second location based at least in part on the first location and the direction, the second location being a location of an object in the captured images; providing, with the imaging device, the location of the object to a query database; receiving, from the query database, descriptive information about the object; and displaying, with the display device, at least some of the descriptive information along with a live display of the video received from the image sensor as the plurality of images are being captured, wherein the descriptive information comprises at least one of historic information, access rates, driving directions, parking information, walking directions, and menus; and associating the location from the location sensor with successive frames of the image from the image sensor.

10. The method of claim 9, further comprising:
storing one of the captured images along with the descriptive information about the object.

11. The method of claim 9, wherein the imaging device further comprises a distance sensor, and wherein calculating a second location comprises calculating a second location based at least in part on the first location, the direction, and a distance captured by the distance sensor.

12. The method of claim 9, wherein the imaging device is incorporated within a wireless phone.

13. The method of claim 9, wherein the object is a landmark.

14. The method of claim 9, wherein the object is a restaurant.

15. The method of claim 9, further comprising:
displaying, with the display device, further information selected from the following: the location of the image sensor, the direction of the image sensor, the distance, and the location of the object.

16. The method of claim 9, further comprising:
updating the descriptive information in real time when the image sensor captures images of different objects.

17. The method of claim 9, wherein the imaging device further comprises a wireless radio, and wherein providing the location of the object to a query database comprises transmitting the location of the object with the wireless radio.

* * * * *